(12) United States Patent
Burian et al.

(10) Patent No.: US 6,263,802 B1
(45) Date of Patent: Jul. 24, 2001

(54) HOPPER CAR OUTLET GATE VALVE

(75) Inventors: William F. Burian, Downers Grove; Andrew C. Crouse, Lisle, both of IL (US); Alex V. Degutis, East Chicago, IN (US); Daniel T. Stevenson, Baytown, TX (US)

(73) Assignee: Salco Products, Inc., Lemont, IL (US)

( * ) Notice: Subject to any disclaimer, the term of this patent is extended or adjusted under 35 U.S.C. 154(b) by 0 days.

(21) Appl. No.: 09/303,008

(22) Filed: Apr. 30, 1999

(51) Int. Cl.[7] ................................................. B65G 53/46
(52) U.S. Cl. ................................. 105/280; 406/129
(58) Field of Search ........................... 105/280, 282.1, 105/282.2, 286, 247; 406/128, 129, 130, 131

(56) References Cited

U.S. PATENT DOCUMENTS

| | | |
|---|---|---|
| 3,701,460 | 10/1972 | Dugge et al. . |
| 3,778,114 * | 12/1973 | Carney, Jr. et al. ................ 406/129 |
| 4,114,785 | 9/1978 | Dugge . |
| 4,151,935 | 5/1979 | Dugge . |
| 4,163,583 | 8/1979 | Hammonds . |
| 4,248,552 * | 2/1981 | Dugge ................................ 406/129 |
| 4,382,725 | 5/1983 | Dugge . |
| 4,397,591 * | 8/1983 | Carney, Jr. et al. ................ 406/131 |
| 4,437,798 | 3/1984 | Schipper . |
| 4,543,851 | 10/1985 | Gilbert . |
| 4,934,877 * | 6/1990 | Haverick et al. .................. 406/128 |
| 5,188,264 | 2/1993 | Parkow et al. . |

* cited by examiner

Primary Examiner—S. Joseph Morano
Assistant Examiner—Andy Wright
(74) Attorney, Agent, or Firm—Wood, Phillips, VanSant, Clark & Mortimer

(57) ABSTRACT

A pneumatic outlet gate of a railroad hopper car has an valve member mounted for rotation in a discharge tube between open and closed positions. The valve member is an arcuate segment terminating laterally at edge faces. The edge faces are angled such that in the upper half of the discharge tube they always slant downwardly from the surface of the tube, while in the lower half of the discharge tube the edge faces face downwardly. An arrangement of stops and abutments prevents rotation of the valve member to a location where the edge faces could trap lading against the discharge tube. Accordingly, the edge faces are self-emptying.

11 Claims, 4 Drawing Sheets

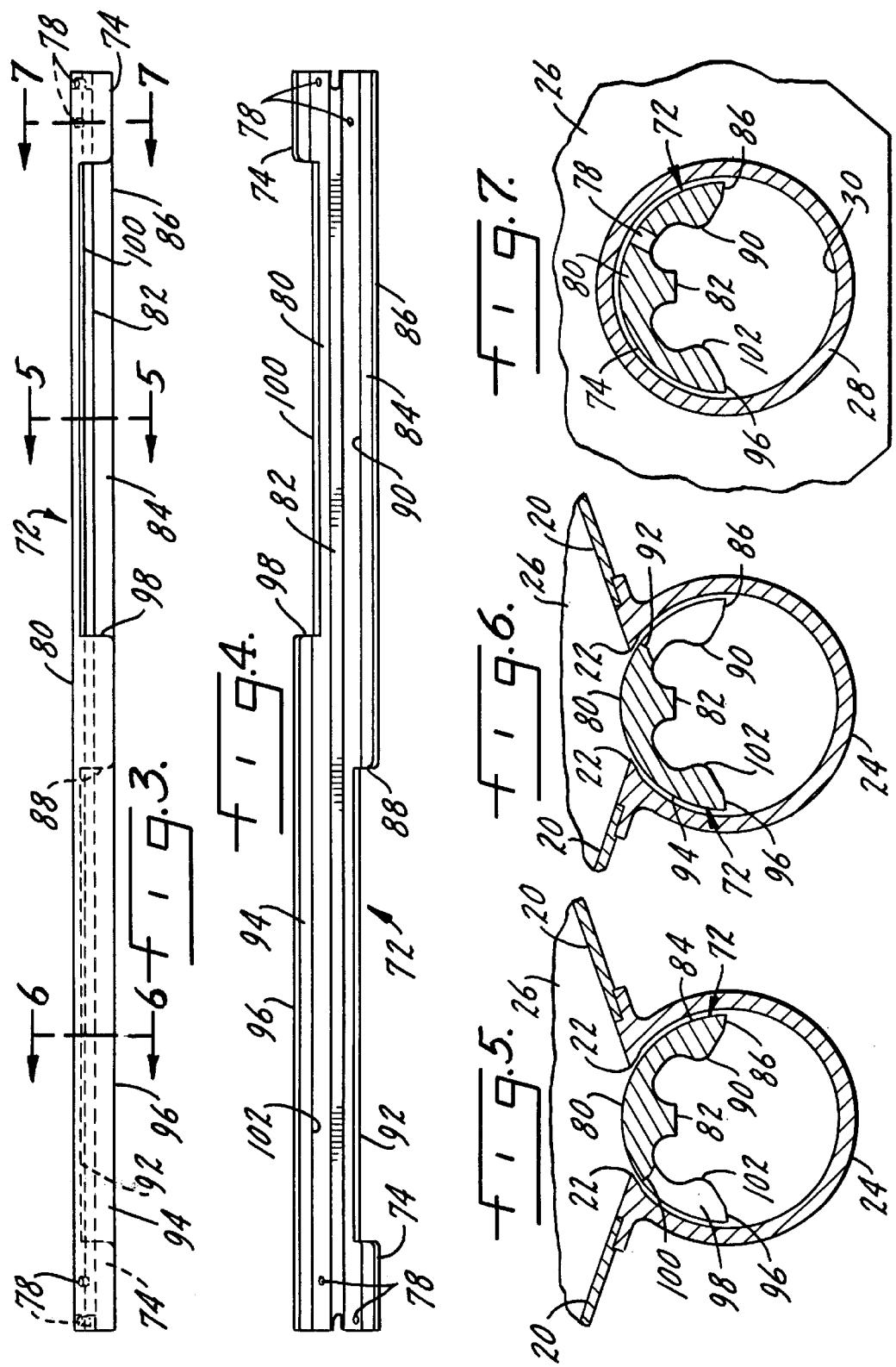

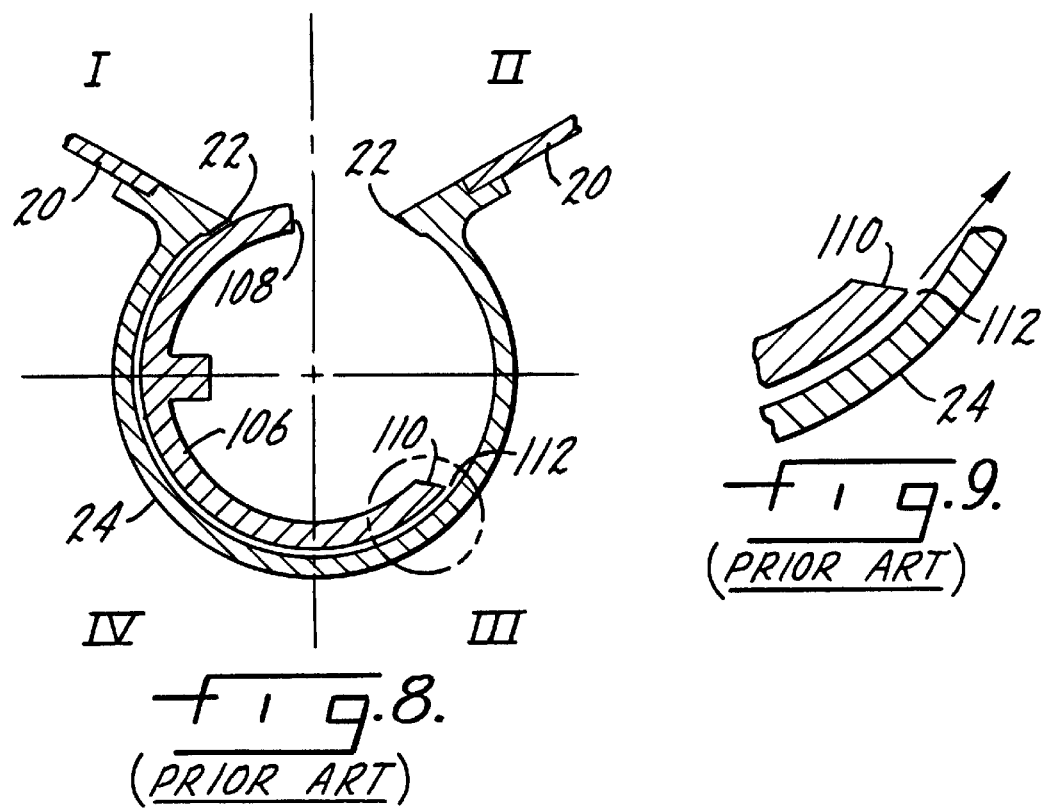
Fig. 8. (PRIOR ART)
Fig. 9. (PRIOR ART)
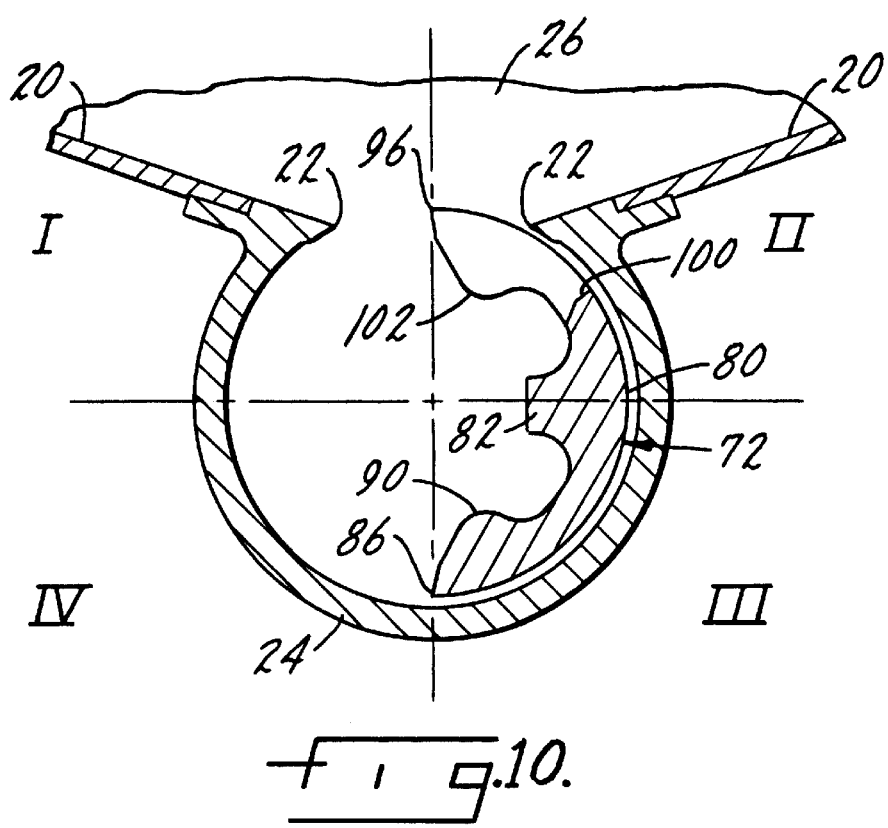
Fig. 10.

HOPPER CAR OUTLET GATE VALVE

BACKGROUND OF THE INVENTION

This invention relates to railroad hopper cars and particularly to a pneumatic outlet gate therefore. Hopper car outlet gates are located on the bottom of the car body. They include slanted bottom walls known as slope sheets. The slope sheets are bounded by end walls. The slope sheets have a gap between them at their lower edges forming a discharge opening. Beneath this opening there is attached a circular discharge tube with an arcuate valve member in it. The discharge tube extends through end walls where it can be connected to vacuum hoses for unloading purposes. The valve member is mounted for rotation in the end walls. The valve can be rotated between open and closed positions where it alternately permits or blocks flow of granular materials through the discharge opening and into the discharge tube. Outlet gates of this general type are exemplified by U.S. Pat. No. 3,778,114, the disclosure of which is incorporated by reference.

Hopper cars are used to transport granular products such as grain, sugar, and plastic pellets. Small amounts of such materials have a tendency to get stuck or caught in a car rather than flow out during unloading. Any corner or crevice becomes a trap for small grains or pellets. The outlet gate valve is a particularly likely place for individual grains to get trapped between the movable valve member and the discharge tube. This leads to the ever present problem in hopper car operations of cleaning a car of all remnants of a load before filling it with a new load. If any such remnants are present, they contaminate the new load. This cannot be tolerated.

While the car compartments have been designed to eliminate corners, ledges or joints where granular materials can become trapped, the outlet gate has been a continuing source of difficulty in assuring complete removal of lading. As mentioned above, remnants of a load tend to get trapped or wedged between the arcuate valve member and the discharge tube. This occurs because the lateral or side edges of the open valve member are permitted to take up a position where, together with the internal wall of the discharge tube, they form a small receptacle which is, in essence, concave upwardly. Lading naturally gets caught in this receptacle. If only a small amount of lading is so trapped it may be possible to crush or pulverize the particles upon subsequent closing of the valve. However, just because it is possible to close the valve does not mean the discharge tube is clean. Further, it sometimes happens that so much material is caught that the valve seizes and cannot be closed.

The prior art solution is to disassemble the outlet gate valve upon every unloading. With the valve element removed the discharge tube can be vacuumed out and inspected to assure total removal of all material. While this method is serviceable if performed correctly, the cost in labor and time is significant. What is needed is an outlet gate that can be totally cleaned without having to remove the valve member from the discharge tube.

SUMMARY OF THE INVENTION

The present invention is directed to an improved railway hopper car outlet gate. The gate has the usual slope sheet and end walls defining a discharge opening. A discharge tube attached to the slope sheets receives material as it flows through the discharge opening. The opening can be open and closed by a valve member which is an arcuate segment mounted concentrically in the discharge tube. The valve member is arranged to prevent formation of concave upward receptacles between the edge faces of the valve member and the inside wall of the discharge tube. This is done by proper selection of the angle of the valve member's edge faces and by a stop arrangement that prevents rotation of the valve member to an orientation that would create such receptacles.

BRIEF DESCRIPTION OF THE DRAWINGS

FIG. 3 is a side elevation view of the valve member of the present invention.

FIG. 4 is a bottom plan view of the valve member of the present invention.

FIG. 5 is a transverse section through the discharge tube and valve member, taken at the location of line 5—5 of FIG. 4.

FIG. 6 is a section similar to FIG. 5, taken along line 6—6 of FIG. 4.

FIG. 7 is a section similar to FIG. 5, taken along line 7—7 of FIG. 4.

FIG. 8 is a transverse section through the discharge tube and valve member of a prior art discharge valve.

FIG. 9 is an enlargement of the area encircled in FIG. 8.

FIG. 10 is a section similar to FIG. 5, showing the valve member rotated to a full open position.

DETAILED DESCRIPTION OF THE INVENTION

Figure 1:
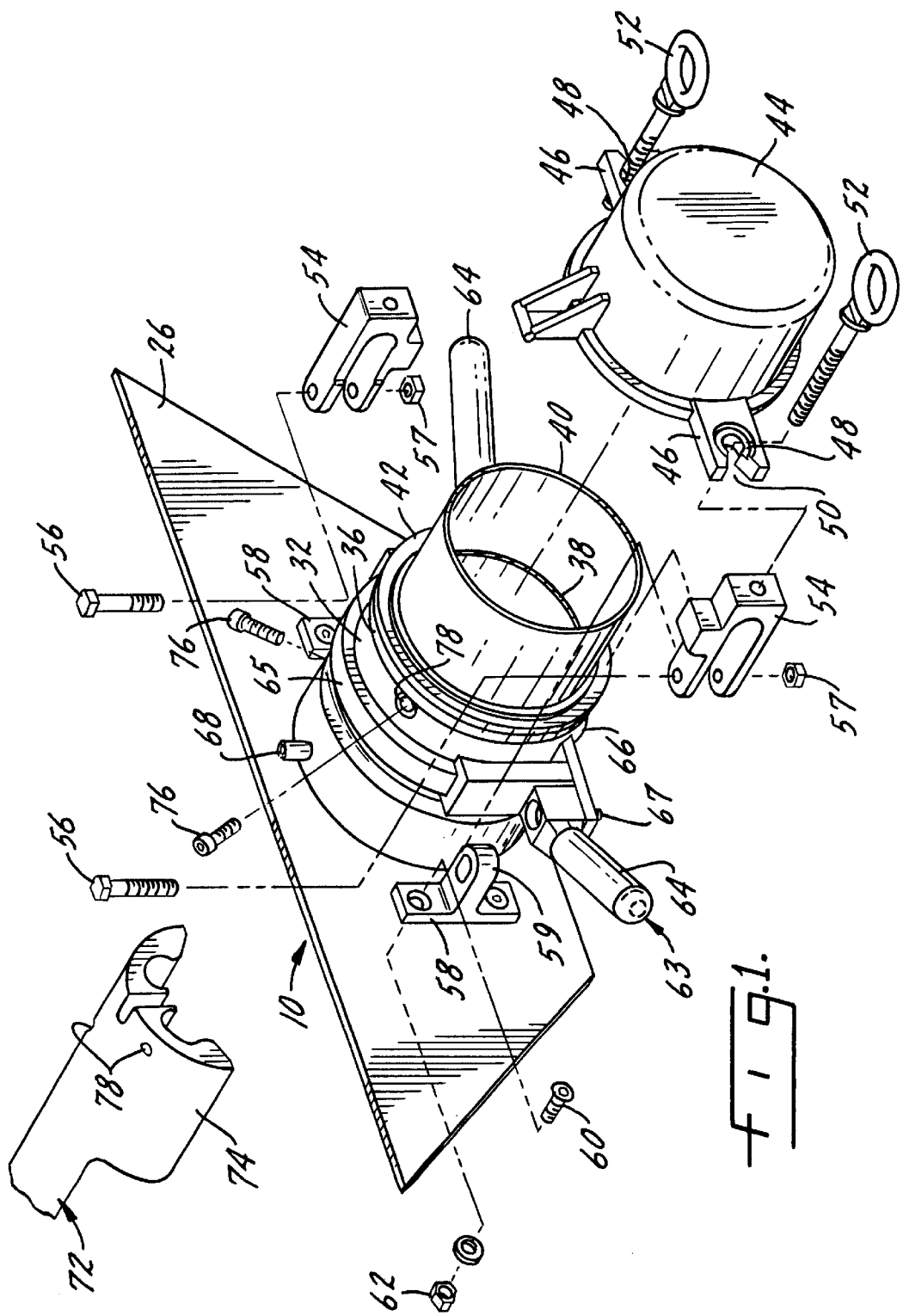
FIG. 1 is an exploded perspective view of one end of the outlet gate of the present invention, with some parts not shown to reveal others.
Figure 2:
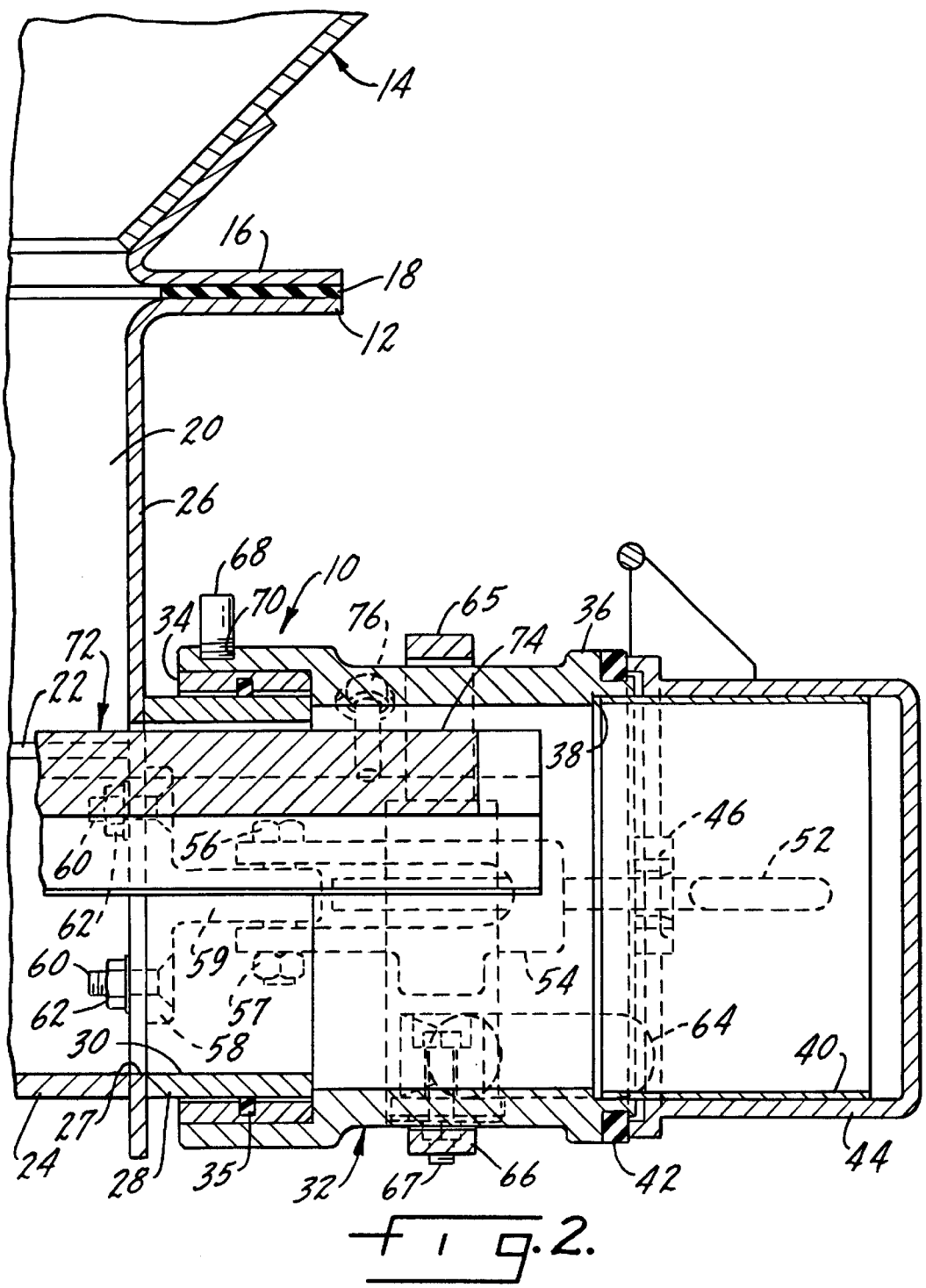
FIG. 2 is a longitudinal section through an end portion of the outlet gate.

FIGS. 1 and 2 illustrate one end of the outlet gate 10 of the present invention. It will be understood that the parts shown in FIGS. 1 and 2 are duplicated on the other end of the gate. The gate has an upper circumferential flange 12 (FIG. 2) which permits attachment of the gate to a car body indicated generally at 14. The car body has a flange 16 around its lower edge. A gasket 18 is positioned between flanges 12 and 16. The flanges are suitably fastened together by nuts and bolts (not shown). The outlet gate 10 includes a pair of slope sheets 20 which slope downwardly and terminate at spaced apart lips 22, one of which can be seen in FIG. 2. The lips define a discharge opening between them. A discharge tube 24 is attached to the underside of the slope sheets and generally surrounds the discharge opening. The discharge tube is substantially cylindrical and extends transversely to the length of the car, i.e., transversely to the tracks on which the car sits. All of the foregoing construction is conventional.

A pair of end walls 26 are connected to the ends of the slope sheets 20. The discharge tube 24 extends to each end wall 26 in communication with a hole 27 in each wall 26. Fixed to the exterior of each end wall 26 and surrounding the hole 27 is an end 20 ring 28. The bottom, inner surface 30 of the end ring 28 is flush with the bottom of the hole 27 and the bottom of the discharge tube 24 to form a smooth continuation of the discharge tube. An end adapter 32 is mounted for rotation on a bearing or wear pad 34 which surrounds the exterior of the end ring 28. A U-cup gasket or wiper 35 surrounds the end ring 28 to prevent entry of dirt or dust between the end ring and bearing.

The outer periphery of the end adapter 32 has a circumferential rim 36 with an interior groove 38 formed therein.

The groove receives a fitting or sleeve 40 to which a pneumatic hose or the like (not shown) may be connected for the pneumatic discharge of the lading from the car. A gasket 42 is positioned on the outer face of the rim 36. A removable end cap generally indicated at 44 may be positioned over the sleeve 40 adjacent the gasket 42. The cap has a pair of extensions or ears 46 (FIG. 1) on either side thereof. Each ear has a bore 48 therethrough which opens to the side through a slot 50.

The cap 44 is releasably secured in a closed position by a pair of eye bolts 52. The shanks of the eye bolts are threaded into holes in the end of pivot arms 54. The pivot arms include a clevis which is pivotally connected by bolts 56 and nuts 57 to brackets 58. The brackets 58 are fastened to the end wall 26 by counter sunk bolts 60 and lock nuts 62. The brackets have cantilevered arms or abutments 59 with openings therein which receive the bolts 56. To remove the cap 44, the eye bolts 52 are loosened by unscrewing them from the pivot arms 54. Once the heads of the eye bolts are clear of the ears 46, the pivot arms 54 are rotated outwardly so that the shanks of the eye bolts slide through the slots 50 in the ears 46. This releases the cap for removal from the sleeve 40. To secure the cap, this process is reversed.

Rotation of the end adapter 32 is effected by a handle assembly 63. The assembly includes a pair of handles 64 joined to a band 65 which wraps around the top of the adapter 32. The handles 64 and band 65 are preferably formed in a single casting. The handle assembly is completed by a strap 66 which wraps around the bottom side of the adapter 32. The strap 66 is fastened to the handle/band casting by bolts 67. The handles 64 are located beneath the pivot arms 54 when the arms are in position to secure the cap 44. In order to effect rotation of the end adapter, the pivot arms 54 have to be swung out of the way. When the arms are situated generally parallel to the end plate 26, the handles 64 will clear the foremost end of the arms 59 and allow the handles to turn the end adapter 32. Rotation of the end adapter and valve member is limited by a stop and two abutments. In the illustrated embodiment the stop is in the form of a set screw 68 and the abutments are the horizontal arms 59 of the brackets 58. The set screw is threaded into a socket 70 near the end of the adapter 32. The set screw 68 extends from the adapter far enough so that the screw will not clear the abutments 59 on either side of adapter. The abutments 59 are so located to limit rotation of the adapter to approximately 180 degrees.

A valve member shown generally at 72 in FIGS. 1 and 2 is mounted for rotation within the discharge tube 24. The valve member has two end portions 74 each of which extends through the end wall opening 27 and end ring 28 and into the interior of the adapter 32. A pair of bolts 76 in bores 78 in each end adapter engage the adjacent end portion 74 of the valve member. The bolts 76 connect the valve member 72 to the end adapter 32 such that the valve member rotates with the end adapter.

Details of the valve member 72 are shown in FIGS. 3–7. The valve member is an elongated part stretching from one end adaptor to the other. FIG. 7 shows that in cross section the valve member is an arcuate segment of 180 degrees on its outside diameter. It has a backbone 80 which runs the fill length of the valve member. The backbone extends arcuately for the middle 70 degrees of the arcuate segment, that is, 35 degrees on either side of the top center when the valve is positioned as in FIGS. 5–7. A longitudinal reinforcing rib 82 is formed on the underside of the backbone. The rib strengthens the valve member A first wing 84 extends arcuately from the backbone. The wing is integrally formed with the backbone. The junction of the backbone and wing is along an imaginary line. The wing extends arcuately from that imaginary line 55 degrees to a free edge where it terminates laterally at an edge face 86. Longitudinally the wing terminates at an end face 88 (FIG. 4). The underside of the wing 84 has a protrusion 90 running along its length. Like the rib 82, protrusion 90 is for strengthening purposes. The wing 84 extends longitudinally from one end portion 74 somewhat greater than half the length of the valve member. Thus, wing 84 terminates at 88, leaving an edge face 92 of the backbone exposed for much of the remaining length of the valve member.

On the side of the backbone opposite the first wing 84 is a second wing 94. This wing is similar to the first wing in that it is integrally formed with the backbone and has a 55 degree arcuate extent, terminating laterally at edge face 96. The second wing 94 extends longitudinally somewhat more than half of the length of the valve member, terminating at 98 and leaving an exposed edge face 100 of the backbone. There is a protrusion 102 on the underside of wing 94. It can be seen that the two wings 84 and 94 overlap somewhat in the center of the valve member. In a sense, the edge faces 92 and 100 define gaps or recessed areas or discharge channels in the valve member and it is through these gaps that the lading will flow when the valve is rotated out of the closed position.

As mentioned above the valve member 72 is an arcuate segment in cross section. It has an outside diameter only slightly less than the inside diameter of the discharge tube. The valve member is concentrically mounted in the discharge tube and extends through the openings 27 in the end wall. The outside diameter of the valve has a minimal clearance from the lips 22. FIG. 8 illustrates a section through the discharge tube and valve member of a prior art construction. The discharge tube defines four quadrants labeled I, II, III and IV. The valve member 106 has an edge face 108 in one of the two upper quadrants and an edge face 110 in the third quadrant, one of the two lower quadrants. The edge face 110 faces upwardly. That is, a line normal to and away from the face at the outside diameter has a component above horizontal, as seen in FIG. 9. This location and angle of the edge face, together with the inside wall of the discharge tube forms a receptacle in which a piece of lading can become entrapped. This receptacle is generally concave upwardly as illustrated at 112 in FIG. 8. Thus, the prior art arrangement of FIG. 8 permits a situation where lading can become trapped between the valve member and the discharge tube.

The present invention is arranged such that none of the valve member's edge faces 86, 92, 96 and 100 will trap lading in the fashion shown in FIG. 8. All of the edge faces of the present invention are self-emptying. By self-emptying it is meant that all of the edge faces in the bottom two quadrants, III and IV, must face down and any edge face in the top two quadrants, I and II, must slant down from the outside diameter of the face to the inside diameter of the face. By face down it is meant that a line extending away from the edge face at the outside diameter and normal thereto is either horizontal or has a vertical component which is below horizontal.

The stop and abutments (in this case the set screw 68 and the bracket arms 59) limit rotation of the valve member so that the self-emptying condition of the edge faces is maintained. By limiting the rotation to approximately 90 degrees in either direction from the fully closed condition, it is assured that all edge faces in the bottom half are facing downwardly and all edge faces in the top half slant down from the outside to the inside. It can be seen that if any part of the valve member extends across the boundary between quadrants III and IV (which might also be considered bottom dead center of the discharge tube), it will not be possible to make an edge face in quadrants III and IV self-emptying. Accordingly, this condition must be avoided.

The use, operation and function of the valve are as follows. The valve member is initially in the position of FIGS. 5, 6 and 7, in which the backbone of the valve fully closes the discharge opening. The stop 68 is located along the vertical center line at this time. To unload the car both of the caps 44 are removed and the pivot arms 54 are swung out of the way of the handles 64. Appropriate vacuum hoses are attached to one or both of the sleeves 40, as desired. To take a sample of the lading, the handles 64 are rotated. A rotation of 10 degrees clockwise from the starting position of FIG. 5 will open a small portion of the near side of the valve. That is, considering the operator to be stationed at the right end of the valve as seen in FIG. 3, a clockwise rotation will move the edge face 100 opposite the discharge opening between the slope sheets, opening a slight gap between a lip 22 and edge face 100 through which lading will fall into the discharge tube. A counterclockwise rotation would similarly provide a little bit of an opening on the far side of the valve as edge face 92 clears the other slope sheet lip. Rotation of about 35 degrees from the starting position will produce about 50% open. Again, rotation clockwise opens the near side valve while counterclockwise rotation opens the far side. A 63 degree rotation from the starting position will provide 100% open, again on near side or far side depending on the direction of rotation. Approximately 90 degree rotation provides full clean out wherein one side is fully open and the opposite side is partially open.

At 90 degrees rotation the stop 68 hits one of the abutments 59, preventing further rotation in that direction. The valve member would be 90 degrees from the positions shown in FIGS. 5–7. Consider an example where the rotation was 90 degrees clockwise from FIGS. 5–7. This is shown in FIG. 10. In this condition the wing edge face 96 is vertical (on the boundary of quadrants I and II) and thus slants down from the outside to the inside diameter. Backbone edge face 100 is in quadrant II and also slants down from outside to inside. Backbone edge face 92 is in quadrant m and faces down. Wing edge face 86 is nearly vertical, approximately on the boundary of quadrants m and IV. Accordingly, all of the edge faces of the valve member in the discharge tube are self-emptying. Any lading particles, pellets or grains in the discharge tube will fall to the bottom of the tube. The valve member does not present any edges where the particles can become trapped or hung up. This allows the discharge tube to be cleaned out by flushing it out with water. Disassembly of the outlet gate is not required.

While a preferred form of the invention has been shown and described, it will be realized that alterations and modifications may be made thereto without departing from the scope of the following claims. For example, the stop could be relocated to be fixed to the end wall while the two abutments are movable with the adaptor. Further, the stop could be other than a set screw, e.g., it could be a drive pin or the like. Also, the arcuate extent of the backbone and wings could be other than as shown, depending on the size of the discharge opening and the desired discharge gaps or channels.

What is claimed is:

1. An outlet gate for a railroad hopper car, comprising:
    first and second slope sheets having spaced lower edges defining a discharge opening;
    first and second end walls connected to the slope sheets;
    a discharge tube attached to the slope sheets near the lower edges for receiving lading from the discharge opening;
    a valve member disposed in the discharge tube and having end portions mounted for rotation in the end walls between a closed position in which the valve member blocks the discharge opening and an open position in which flow is permitted through at least a portion of the discharge opening, the valve member comprising an arcuate segment bounded by edge faces;
    at least one stop connected to one of the end wall or valve member; and
    at least one abutment connected to the other of the end wall or valve member, the stop and abutment being engagable with one another to limit rotation of the valve member, the angle of the edge faces and the stop and abutment being arranged such that all edge faces are slanted down from outside to inside diameter, vertical or faced down at all open position of the valve member to allow the edge faces to be self emptying.

2. The outlet gate of claim 1 wherein the discharge tube has a generally circular cross section and the stop and abutment are arranged to prevent any part of the valve member from straddling bottom dead center of the discharge tube.

3. The outlet gate of claim 1 wherein the valve member comprises:
    a central backbone of an arc large enough to allow the backbone to fully block the discharge opening when the backbone is centered on said opening;
    first and second lateral wings attached to opposite sides of the backbone and extending from opposite end portions partially toward the other end portion such that each wing will block one side of the discharge opening when the backbone has been rotated to open the other side of said opening.

4. The outlet gate of claim 3 wherein the first and second wings overlap intermediate the end portions of the valve member.

5. The outlet gate of claim 3 wherein the backbone has a strengthening rib on one side thereof.

6. The outlet gate of claim 3 wherein each wing has a strengthening rib on one side thereof.

7. The outlet gate of claim 1 wherein the abutment comprises a bracket attached to the end wall.

8. The outlet gate of claim 7 wherein the stop comprises a set screw connected to the valve member and extending sufficiently therefrom to be engagable with the bracket.

9. The outlet gate of claim 1 further comprising an end adaptor connected to each end portion of the valve member, and wherein the abutment is fastened to the end wall on one side of the end adaptor, and the stop is mounted on at least one end adaptor and extends sufficiently therefrom to be engagable with the abutment.

10. The outlet gate of claim 9 further comprising a second abutment fastened to the end wall on the other side of the end adaptor, an outlet cap removably mounted on the end adaptor, and pivot arms connected to the abutments, the pivot arms being connectable to the outlet cap to releasably retain it on the end adaptor.

11. In an outlet gate for a railroad hopper car of the type comprising first and second slope sheets having spaced lower edges defining a discharge opening, first and second end walls connected to the slope sheets, a generally cylindrical discharge tube attached to the slope sheets near the lower edges for receiving lading from the discharge opening, a valve member disposed in the discharge tube and having end portions mounted for rotation in the end walls between a closed position in which the valve member blocks the discharge opening and an open position in which flow is permitted through at least a portion of the discharge opening, the valve member comprising a arcuate segment bounded by edge faces, the improvement comprising:

at least one stop connected to one of the end wall or valve member;

at least one abutment connected to the other of the end wall or valve member, the stop and abutment being and engagable with one another to prevent any part of the valve member from staddling dead center of the discharge tube; and wherein the angle of the edge faces being arranged such that all edge faces are slanted down from outside to inside diameter, vertical or faced down at all open position of the valve member to allow the edge faces to be self emptying.

\* \* \* \* \*